G. C. BUQUO.
SPEED INDICATOR.
APPLICATION FILED SEPT. 14, 1909.
972,158.
Patented Oct. 11, 1910.
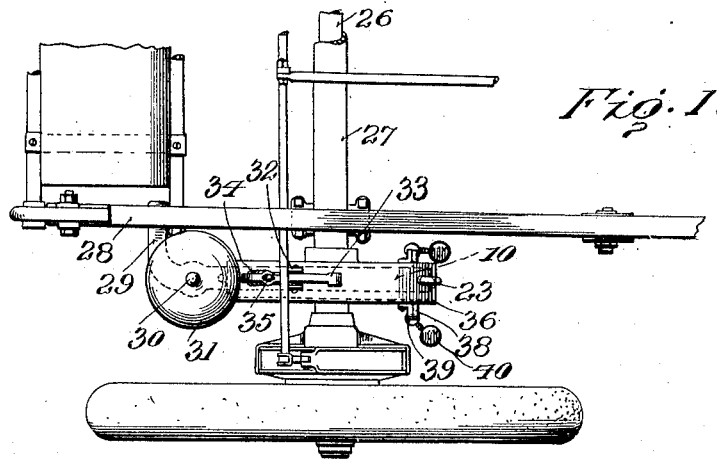
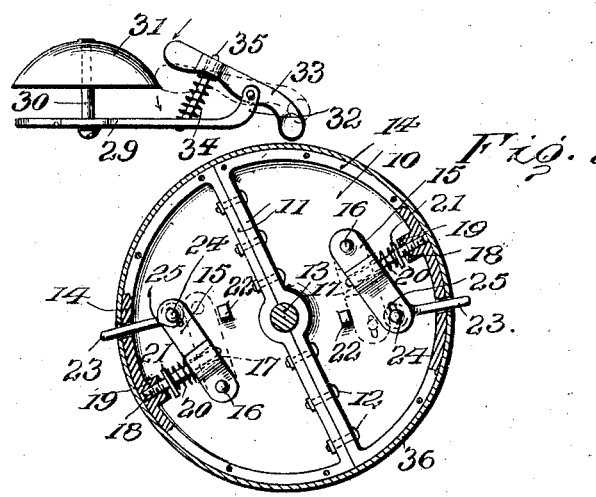
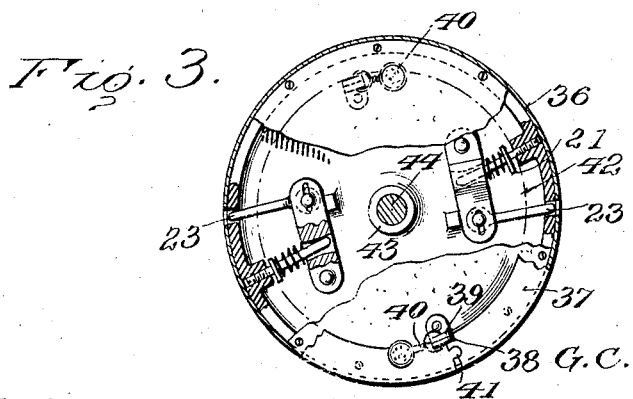
Inventor
G. C. Buquo.

UNITED STATES PATENT OFFICE.

GEORGE C. BUQUO, OF FLETCHER, NORTH CAROLINA.

SPEED-INDICATOR.

972,158.  Specification of Letters Patent.  Patented Oct. 11, 1910.

Application filed September 14, 1909. Serial No. 517,665.

*To all whom it may concern:*

Be it known that I, GEORGE C. BUQUO, citizen of the United States, residing at Fletcher, in the county of Henderson and State of North Carolina, have invented certain new and useful Improvements in Speed-Indicators, of which the following is a specification.

This invention relates to indicators, and has special reference to that class of such devices which are known as "speed indicators."

An object of this invention is to provide a vehicle with means whereby excessive speed will be automatically indicated by a sounding device which is located upon the vehicle and which is operated through the movement of the same.

The invention has for another object the provision of a simple, durable device for sounding an alarm upon the attaining of a predetermined rate of speed of the vehicle and which is so constructed that the mechanism may be adjusted to sound the alarm at various rates of speed as desired.

The invention has for a still further object the provision of an indicator possessing the above features and which is of simple formation so that the same will occupy but small space upon the vehicle.

The improved indicator is so formed that should it be desired a seal may be attached to the same whereby the operator of the vehicle would not be able to tamper with the adjustment of the device which could be set by official inspectors in accordance with the laws regulating the speed of the vehicle.

For a full understanding of the invention and also to acquire a knowledge of the details of construction of the same, reference is to be had to the following description and accompanying drawings, in which:

Figure 1 is a top plan view of a section of the rear end of a motor vehicle disclosing the improved indicator as applied to the same; Fig. 2 is a side elevation of the same, disclosing parts in section; and Fig. 3 is a slightly modified form of the indicator drum, partly disclosed in section.

Corresponding and like parts are referred to in the following description and indicated in all the views of the accompanying drawings by the same reference characters.

Referring to the drawings, and particularly to Fig. 2 of the same, the device comprises a drum 10 which is preferably formed of two semi-circular portions having flanges 11 formed upon the inner adjoining edges of the same, the flanges 11 being extended inwardly from the edges and adapted for engagement with one another for the reception of bolts 12 to clamp the flanges 11 together, and to thereby form a complete drum. It will be noted from Fig. 2 that intermediately of the inner edges of the sections of the drum 10 semicircular depressions or recesses are formed for the reception of an axle 13, or other movable element about which the drum 10 is frictionally and rigidly retained.

The sections of the drum are each provided with flanges 14 disposed about their rounded edges and are each extended laterally therefrom in the same direction as the flanges 11, the flanges 14 forming the periphery of the drum in which is disposed the operative mechanism hereinafter set forth. Within the drum 10 are arms 15 which are pivotally mounted upon headed studs 16 or the like to permit of the swinging of the arms 15 radially within the drum. The arms 15 are provided intermediately with apertures 17 which are enlarged adjacent the opposite edges of the arms 15 to receive the inner extremities of set screws 18 which are extended inwardly from the flanges 14 and received by the arms 15 to serve as guides for the same. The flanges 14 are provided with bosses 19 formed upon the inner faces of the same and which serve as retaining means for rigidly holding the set screws 18 radially within the drum. Helical springs 20 are employed which are engaged about the set screws 18 and are engaged at their opposite extremities against the bosses 19 and with washers 21 located against the outer edges of the arms 15. With this construction the arms 15 are normally held in an inward position and against stops 22 raised from the face of the web of the drum and the arms are thus caused to retain striking pins 23 in an inward position. The striking pins 23 are engaged through the flanges 14 and are adapted for sliding movement therethrough under the action of the arms 15. The pins 23 carry rivets 24 which are extended laterally from the inner ends of the pins 23 and which are loosely engaged in slots 25 formed longitudinally in the outer ends of the arms 15 to permit of the vibration of the same without materially altering the direction of the longitudinal movement of the pins 23. As disclosed in Fig. 1 the sections of the drum 10 are engaged about the rear axle 26 of a motor vehicle, the sleeve 27 supporting the axle being broken away at the point of contact between the drum 10 and the axle 26. Although this construction is disclosed, any other means may be employed for rotating the drum 10 with respect to the motion of the vehicle.

The sounding mechanism proper, which is disclosed as being supported upon the lower portion of the spring 28 of the motor vehicle, whereby the sounding mechanism is disposed in rigid relation to the plane of the rotary drum, comprises an arm 29 which is rigidly secured to the stationary portion of the frame and which carries a stem 30 upwardly extended from the inner end of the same upon which is mounted a suitable bell 31. The outer end of the arm is provided with a lug 32 which is formed by the upward turning of the outer end of the arm 29 upon which is pivotally mounted a clapper 33 having its outer extremity normally held adjacent the periphery of the drum 10 while its inner end is retained in an upward position away from the bell 31 by the provision of a helical spring 34. The spring 34 is disposed between the arm 29 and the under edge of the clapper 33 and is held in such position through the medium of a bolt 35 which is rigidly carried by the arm 29 and is loosely disposed through the aperture formed in the inner end of the clapper 33 thereby permitting of the reciprocation of the inner arm of the clapper 33 thereupon.

In connection with this device an improved seal is employed for preventing access to the set screws 18 within the drum in order to thereby prevent the operator of the vehicle from adjusting the set screws to sound the alarm at any speed which the operator desires without detecting such an adjustment. The improved seal comprises a metallic band 36 which is provided with annular inwardly extended flanges 37 for engagement over the flanges 14 of the drum, the metallic band 36 being thereby disposed over the apertures formed in the periphery of the drum for access to the set screws 18 thereby preventing the tampering with the set screws while the band 36 is in position. The band 36 is provided at suitable points with lugs 38 which register with lugs 39 carried upon the drum to permit of the positioning of a suitable lock 40 through the lugs 38 and 39 to prevent the removal of the band 36 without detection. In Fig. 3 the fastening means for the same is clearly disclosed showing at the bottom of the figure the lugs 38 and 39 and an interlocking tongue 41 formed upon one end of the band 36 for engagement within the corresponding portion formed in the opposite extremity of the band.

The modification which is disclosed in Fig. 3 exists only in the formation of the drum 42 wherein a drum is disclosed which is integrally formed in one piece and is provided with suitable bushings 43 for binding the central portion of the drum 42 upon the movable shaft 44.

In operation, when the shaft or axle 13 is revolved the drum 10 is carried therewith and the arms 15 are swung outwardly proportionately to the speed at which the drum 10 is revolved by centrifugal force to force the striking pins 23 outwardly through the flanges 14 and to thereby dispose the same in the path of the outer end of the clapper 13 to cause the vibration of the clapper 33 and to engage the inner end of the clapper against the bell 31. It will be noted that the set screws 18 can be adjusted to increase or decrease the tension upon the arms 15 so as to necessitate various speeds of the drum 10 for throwing the striking pins 23 outwardly in the path of the clapper 33. It will be noted that the outer end of the clapper 33 is spaced slightly from the periphery of the drum 10 whereby the striking pins are limited in their free movement without engaging the clapper 33 and to thereby permit various speeds of the drum within such limitation.

The apertures 17 formed through the arms 15 which are enlarged at the opposite edges of the arms, permit of the vibration of the arms 15 without binding upon the set screws 18.

Having thus described the invention, what is claimed as new is:—

1. A speed indicator including a drum, arms yieldably disposed in said drum, striking pins carried by said arms and extended through the periphery of said drum, a bell mechanism located adjacent said drum and adapted for actuation by said striking pins, means for adjusting the tension of said arms in said drum and a seal carried by said drum for protecting said adjusting means.

2. A speed indicator including a drum, arms pivotally disposed within said drum, springs carried by said drum and engaged with said arms to normally hold the same inwardly in said drum, stops located within said drum to limit the inward movement of said arms, set screws engaged with said drum and said arms to regulate the tension of said springs, striking pins loosely mounted in the outer ends of said arms and extended through the periphery of said drum and a bell mechanism located outwardly of said drum for operation under the action of said striking pins.

3. A speed indicator including a rotary drum, arms pivotally mounted in said drum for outward movement under centrifugal force, springs disposed in said drum and engaged with said arms to regulate the movement of the latter, striking pins loosely disposed in the outer ends of said arms and extended through the periphery of said drum and a bell mechanism located outwardly of said drums for engagement with said striking pins.

4. A speed indicator including a rotatable drum, arms pivotally mounted within said drum and adapted for outward movement upon the rotation of said drum, springs mounted in said drum and engaged against said arms to regulate the tension of the same, set screws carried by said drum to support said springs and extended inwardly from the periphery of the drum to engage said arms, striking pins carried by said arms and extended through the periphery of said drum and a bell mechanism located outwardly of said drum to be actuated by said striking pins.

5. A speed indicator including a rotary drum, arms pivoted in said drum, striking pins slidably disposed through the periphery of said drum and pivotally connected to said arms, said arms adapted to swing outwardly under centrifugal force, set-screws carried by said drum and loosely connected to said arms, springs arranged about said set-screws and engaged against said arms to retard the outward movement thereof, and a sounding device disposed adjacent said drum to be actuated by said striking pins.

In testimony whereof I affix my signature in presence of two witnesses.

GEORGE C. BUQUO. [L. S.]

Witnesses:
SALLIE J. SORRELL,
LETA M. BUQUO.